(12) United States Patent
Weber

(10) Patent No.: US 7,182,196 B2
(45) Date of Patent: Feb. 27, 2007

(54) TWO WAY LOCKING ROTARY DRIVE CLUTCH ASSEMBLY

(75) Inventor: James Leo Weber, West Bloomfield, MI (US)

(73) Assignee: Intier Automotive Inc., Aurora (CA)

( * ) Notice: Subject to any disclaimer, the term of this patent is extended or adjusted under 35 U.S.C. 154(b) by 111 days.

(21) Appl. No.: 10/503,109

(22) PCT Filed: Feb. 6, 2003

(86) PCT No.: PCT/US03/03667

§ 371 (c)(1),
(2), (4) Date: Nov. 1, 2004

(87) PCT Pub. No.: WO03/066369

PCT Pub. Date: Aug. 14, 2003

(65) Prior Publication Data

US 2005/0056518 A1    Mar. 17, 2005

Related U.S. Application Data

(60) Provisional application No. 60/354,829, filed on Feb. 6, 2002.

(51) Int. Cl.
*B60N 2/22* (2006.01)
*F16D 41/10* (2006.01)

(52) U.S. Cl. .................. 192/223.1; 192/15; 192/19; 297/367

(58) Field of Classification Search .................. None
See application file for complete search history.

(56) References Cited

U.S. PATENT DOCUMENTS

| | | |
|---|---|---|
| 1,942,472 A | 1/1934 | Craw |
| 4,648,575 A | 3/1987 | Kawade |
| 5,216,936 A | 6/1993 | Baloche |
| 5,277,672 A * | 1/1994 | Droulon et al. ............. 475/176 |
| 5,769,494 A | 6/1998 | Barrere et al. |

(Continued)

FOREIGN PATENT DOCUMENTS

GB    273 365    7/1927

(Continued)

*Primary Examiner*—Saul Rodriguez
(74) *Attorney, Agent, or Firm*—Clark Hill PLC

(57) ABSTRACT

A-way locking rotary drive clutch assembly for actuating an adjuster mechanism on an automotive vehicle seat including a cylinder (30) fixedly secured to the vehicle seat and a mobile flange (40) rotatable journaled to the cylinder and fixedly secured to an input shaft (18) for externally actuating the adjuster mechanism. The cylinder includes a cylindrical bearing surface. The clutch assembly includes a plurality of cams (50, 52) enactable with the bearing surface to prevent rotation of the mobile flange relative to the cylinder. The cams are rotatable assembled to the mobile flange for moving in and out of engagement with the bearing surface. The cams are biased into engagement with the bearing surface. A handle body (60) journaled to the cylinder includes a plurality of teeth engagable with teeth on the mobile flange. Tabs (62) extend from the handle body to move the cams out of engagement with the bearing surface during rotation of the handle body relative to the mobile flange. The spacing between the teeth of the mobile flange and handle body is greater than the spacing between the tabs and respective cams so that the cams disengage the bearing surface of the cylinder before the teeth of the mobile flange and handle body engage.

18 Claims, 7 Drawing Sheets

U.S. PATENT DOCUMENTS

| | | | |
|---|---|---|---|
| 5,881,854 A * | 3/1999 | Rougnon-Glasson | 192/15 |
| 6,120,098 A | 9/2000 | Magyar et al. | |
| 6,149,235 A | 11/2000 | Fahim | |
| 6,206,164 B1 | 3/2001 | Kurita | |
| 6,212,965 B1 | 4/2001 | Hochmuth | |
| 6,224,157 B1 * | 5/2001 | Di Luccio | 297/362 |
| 6,230,867 B1 | 5/2001 | Schwarzbich | |
| 6,629,733 B2 * | 10/2003 | Matsuura et al. | 297/366 |
| 2002/0043856 A1 | 4/2002 | Ikegaya | |

FOREIGN PATENT DOCUMENTS

WO      WO0015973 A1 *    3/2000

* cited by examiner

TWO WAY LOCKING ROTARY DRIVE CLUTCH ASSEMBLY

RELATED APPLICATION

This patent application is a §371 of PCT/US03/03667, filed on Feb. 6, 2003, which claims priority to and all the benefits of U.S. Provisional Patent Application No. 60/354,829 filed on Feb. 6, 2002.

FIELD OF THE INVENTION

The invention relates to a friction-type clutch mechanism for actuating a rotary input shaft of an adjustment mechanism for a seat of a motor vehicle. More particularly, the invention relates to a clutch assembly actuate a rotary input shaft to move an adjuster mechanism in two directions using a reciprocating input device.

DESCRIPTION OF THE RELATED ART

Automotive vehicles include seat assemblies for supporting occupants within the vehicle. Seat assemblies typically include a seat cushion for supporting a seated occupant and a seat back for supporting the upper torso of the occupant. To accommodate a wide range of occupant shapes and sizes, seat assemblies commonly incorporate various adjusters to manipulate the shape of the seat back or seat cushion, to adjust the orientation of the seat back relative to the seat cushion, and to adjust the position of the seat assembly within the vehicle with respect to generally fixed pedal and steering wheel locations. For example, it is well known in the seating art to incorporate a manual height adjuster assembly between the seat cushion and the vehicle floor to allow the occupant to manually adjust the height of the seat cushion or the entire seat assembly relative to the vehicle floor. To adjust the height of the seat assembly, the occupant actuates a rotary knob or lever arm extending outwardly from the height adjuster assembly. It is common for a height adjuster assembly to include a clutch mechanism between the knob or lever arm and the height adjuster assembly to prevent the weight of the occupant or vehicle accelerations from back-driving the height adjuster assembly. However, current height adjuster assemblies utilize complex, or otherwise expensive, spring friction or roller ball type clutch designs.

Accordingly, it remains desirable to provide a simple, low-cost clutch design for use in conjunction with adjuster mechanisms in the seat assembly, such as height adjuster assemblies.

SUMMARY OF THE INVENTION

A clutch assembly actuates an input shaft of an adjuster mechanism in a seat for a motor vehicle. The clutch assembly includes a cylinder that is fixedly secured to the seat. The cylinder includes an inner wall. The clutch assembly also includes a mobile flange that is fixedly secured to the input shaft for rotating the input shaft with respect to the cylinder. A cam mechanism selectively engages the inner wall of the cylinder to prevent movement of the mobile flange and the input shaft relative to the cylinder. The cam mechanism is operatively assembled to the mobile flange for movement in and out of engagement with the cylinder. The clutch assembly also includes an actuator operatively interconnected to the cylinder for movement relative to the mobile flange. The actuator includes a tab engagable with the cam during movement of the actuator relative to the mobile flange to move the cam out of engagement with the cylinder to release the adjuster mechanism allowing movement of the seat.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
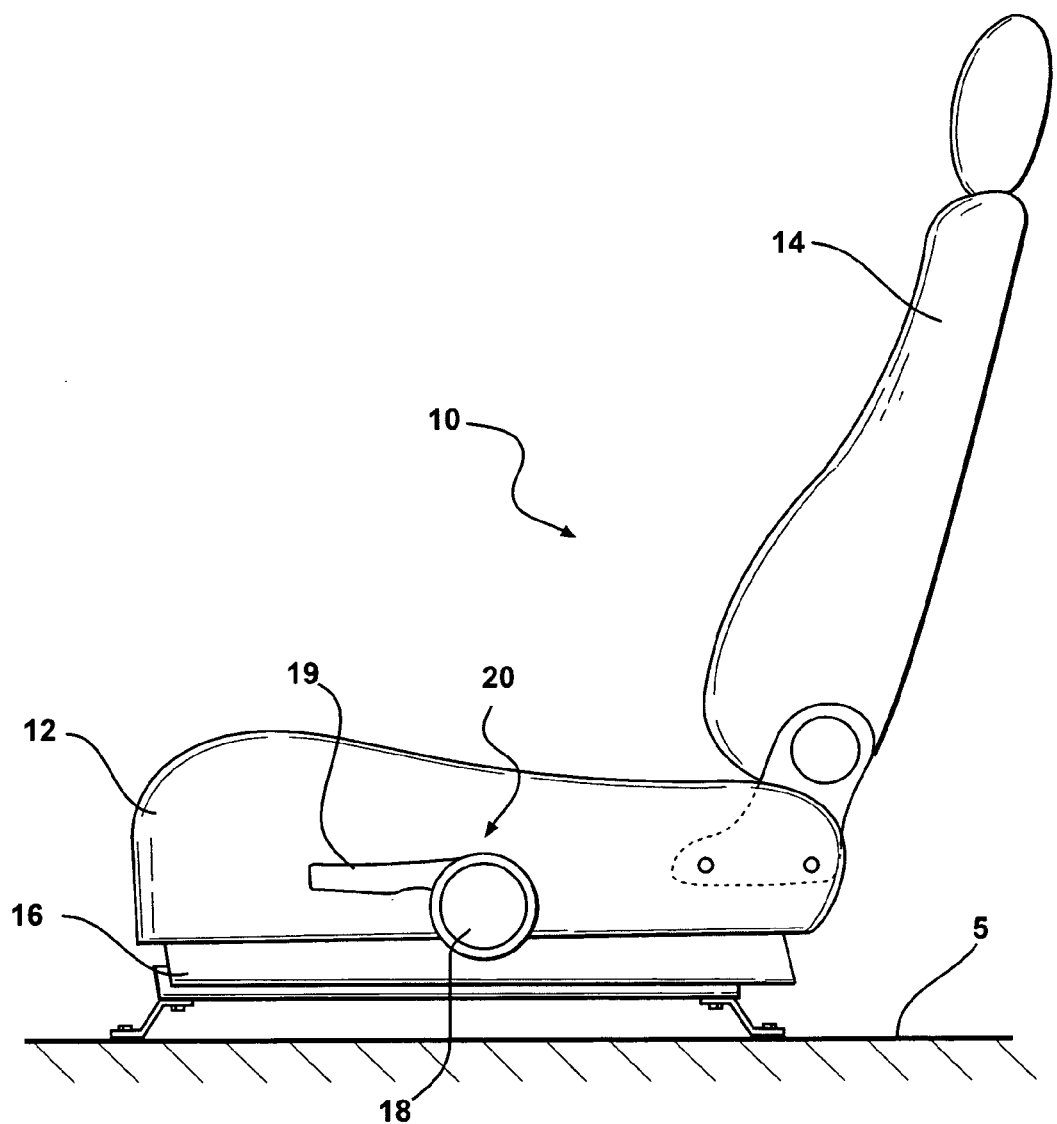
FIG. 1 is a side view of a seat incorporating a clutch assembly according to one embodiment of the invention.

Referring to FIG. 1, a seat 10 is shown for supporting an occupant above a floor 5 within a motor vehicle, represented by the floor 5. The seat 10 includes a clutch assembly 20 according to the invention. For illustrative purposes, the clutch assembly 20 is discussed below used in conjunction with a seat height adjuster mechanism. It should be appreciated by those skilled in the art that the clutch assembly 20 is easily adaptable for use with other types of mechanisms on the seat 10 utilizing a rotary input shaft, such as seat back recliner mechanisms or pivoting armrest assemblies.

The seat 10 includes a seat cushion 12 and a seat back 14 pivotally interconnected to the seat cushion 12 for movement between a plurality of reclined positions. A height adjuster mechanism 16 extends between the seat cushion 12 and the vehicle floor 5. The height adjuster 16 allows the occupant to adjust the height of the seat 10 relative to the vehicle floor 5. The adjuster mechanism 16 is biased in a locked state wherein the height of the seat 10 is maintained. The adjuster mechanism 16 is selectively movable from the locked state to an unlocked state to allow the height adjustment of the seat 10. A rotating input shaft 18 is operatively coupled to the adjuster mechanism 16 for actuation of the adjuster mechanism 16 to move the seat cushion 12 between its various positions of height. The input shaft 18 extends out beyond the end of the seat cushion 12.

A lever 19 extends outwardly from the terminal end of the input shaft 18 to facilitate actuation of the adjuster mechanism 16. Described in greater detail below, the clutch assembly 20, disposed between the input shaft 18 and the lever 19, prevents back driving of the adjuster mechanism 16 by weight of the occupant or vehicle accelerations, while also transferring occupant input applied upon the lever 19 to the input shaft 18.

Figure 3:
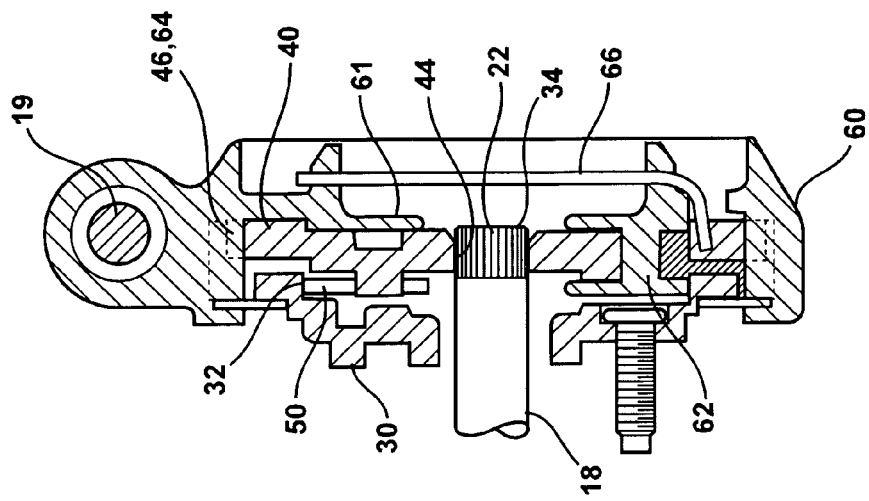
FIG. 3 is a cross-sectional end view taken along lines 3—3 of FIG. 2.
Figure 2:
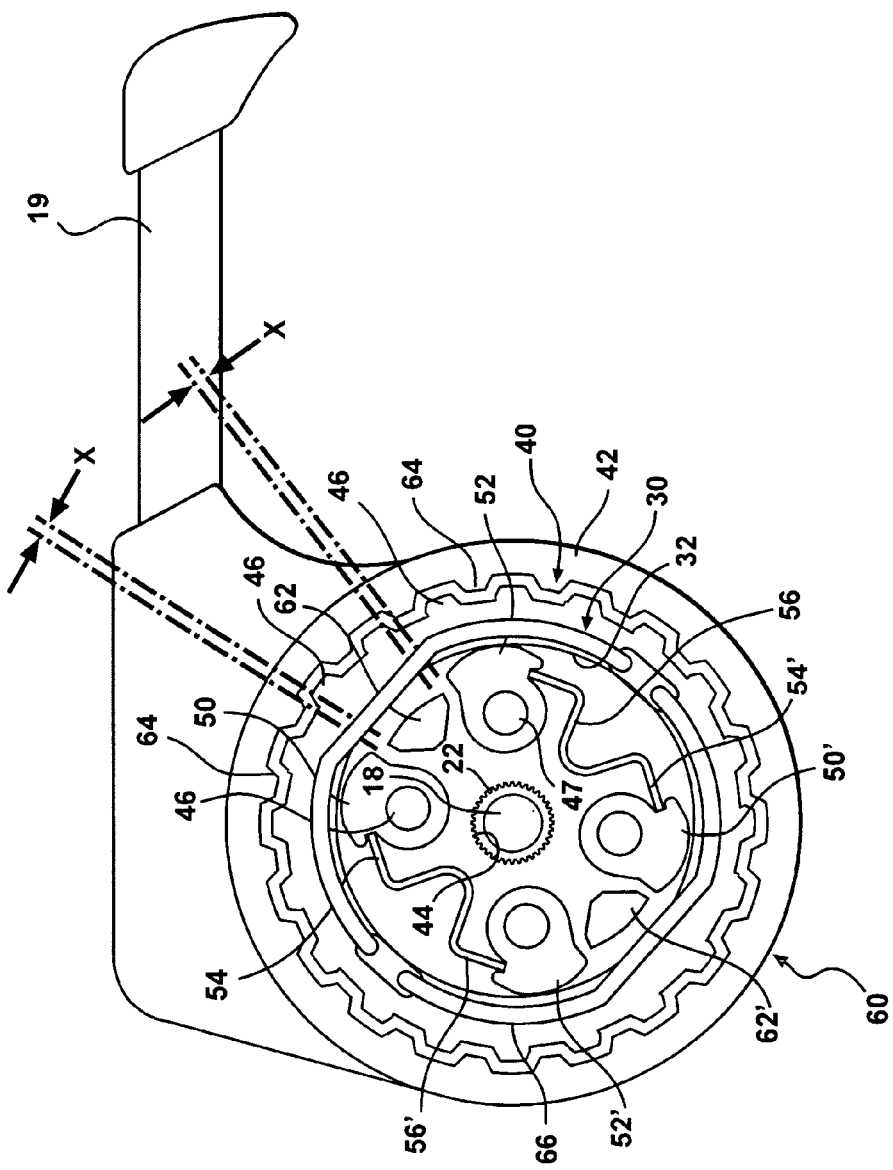
FIG. 2 is a side view of the clutch assembly.

Referring to FIGS. 2 and 3, the clutch assembly 20 includes a cylinder 30 fixedly assembled to the seat cushion 12, or alternatively, to a portion of the adjuster mechanism 16 movable with the seat cushion 12. The cylinder 30 includes an inner wall 32 aligned with the input shaft 18. The terminal end 34 of the input shaft 18 projects axially through and beyond the cylinder 30 presenting a mounting surface 22. A mobile flange 40 rotatably journaled to the cylinder 30 extends between a generally periphery 42 aligned axially with the input shaft 18 and an inner bore surface 44 adapted to receive the mounting surface 22 of the input shaft 18 therethrough in a keyed, press fit relationship for rotational movement therewith. Alternatively, the mobile flange 40 is fixedly secured to the mounting surface 22 by welding, or the other suitable fixing means. Thus, rotating the mobile flange 40, which is fixedly secured to the input shaft 18, actuates the adjuster mechanism 16. A plurality of outwardly extending teeth 46 extends radially outwardly from the periphery 42.

A pair complementary of first and second cams 50, 52 are disposed between the cylinder 30 and mobile flange 40. Each of the first and second cams 50, 52 are rotatably assembled to a respective pivot pin 45, 47 extending axially from the mobile flange 40 for movement into and out of engagement with the inner wall 32 of the cylinder 30. When engaged with the inner wall 32, the first and cams 50, 52 are wedged between the respective pivot pin 45, 47 and the inner wall 32. While so positioned, friction between the first 50 and second 52 cams and the inner wall 32 prevents clockwise and counterclockwise rotation, respectively, of the mobile flange 40 relative to the cylinder 30, as viewed in FIG. 2.

First and second biasing members 54, 56 act between the mobile flange 30 and the first and second cams 50, 52, respectively, for rotatably biasing the first and second cams 50, 52 towards engagement with the bearing surface 32.

The clutch assembly 20 includes an actuator 60 for moving the first or second cams 50, 52 and rotating the mobile flange 40 thereafter to actuate the adjuster mechanism 16. More specifically, the actuator 60 includes a cylindrical plate 61 having a tab 62 projecting axially out from the actuator 60 and between the first cam 50 and second cam 52 for moving the first cam 50 or second cam 52 away from the inner wall 32 during counterclockwise or clockwise rotation, respectively, of the actuator 60, as viewed in FIG. 2. The tab 62 is generally evenly spaced apart from each of the first 50 and second 52 cams by a predetermined distance X, as indicated in FIG. 2.

The actuator 60 further includes a plurality of inwardly extending teeth 64 engagable with the outwardly extending teeth 46 extending from the mobile flange 40 for rotating the mobile flange 40 during rotation of the body 60. Each inwardly extending tooth 64 of the actuator 60 is generally evenly spaced apart from an adjacent outwardly extending tooth 46 of the mobile flange 40 to create a gap Y, as indicated in FIG. 2. The gap Y is greater than the predetermined distance X, so that the first 50 or second 52 cams are disengaged with the inner wall 32 before the inwardly extending teeth 64 on the actuator 60 engage the outwardly extending teeth 46 on the mobile flange 40 to rotate the mobile flange 40 counterclockwise or clockwise, respectively, relative to the cylinder 30. Alternatively, the body 60 is assembled in a keyed relationship with the mobile flange 40 for driving the same and is movable counterclockwise or clockwise relative to the mobile flange 40 through the distance Y before tab 62 engages the first cam 50 or second cam 52, respectively.

The lever 19 extends from the actuator 60 for facilitating manual actuation of the adjuster mechanism 16 via the clutch assembly 20. Alternatively, the lever 19 may be replaced by using a knurled actuator 60. A third biasing member 66 extends between the mobile flange 40 and the actuator 60 to maintain the distance Y between the outwardly extending teeth 46 and the inwardly extending teeth 64.

In operation, engagement of the first 50 and second 52 cams with the inner wall 32 prevents back driving of the clutch assembly 20 via the input shaft 18. For example, the weight of the occupant upon the seat cushion 12 or accelerations of the vehicle due to road input transferred through the input shaft 18 would not cause rotation of the mobile flange 40 relative to the cylinder 30. The actuator 60 is rotated counterclockwise, for example, to actuate the adjuster mechanism 16, and thereby, lift the seat 10. The tab 62 moves the first cam 50 out of engagement with the bearing surface 32 before the inwardly extending teeth 64 on the actuator 60 contact the outwardly extending teeth 46. With the first cam 50 disengaged with the inner wall 32, the mobile flange 40 is freely movable in the counterclockwise direction relative to the cylinder 30. The mobile flange 40 begins to rotate counterclockwise when the inwardly directed teeth 64 engage the outwardly extending teeth 46. The input shaft 18 rotates counterclockwise with the mobile flange 40, thereby actuating the adjuster mechanism 16. Once the desired adjustment is made, the first cam 50 is allowed to re-engage the bearing surface 32 of the cylinder 30 under the bias of the first biasing member 54. The third biasing member 66 moves the actuator 60 clockwise relative to the mobile flange 40 until each of the outwardly extending teeth 46 are spaced from the inwardly extending teeth 64 by the gap Y. The operation is similar for clockwise rotation of the actuator 60 to lower the seat 10. The tab 62 moves the second cam 52 out of engagement with the inner wall 32 of the cylinder 30 to allow clockwise rotation of the mobile flange 40, and ultimately the input shaft 18, relative to the cylinder 30. Once desired adjustment is complete, the second cam 52 is allowed to re-engage the bearing surface 32 under the bias of biasing member 56 in order to prevent further rotation of the mobile flange 40 relative to the cylinder 30. The third biasing member 66 moves the body 60 counterclockwise relative to the mobile flange 40 until each of the outwardly extending teeth 46 are spaced from each of the inwardly extending teeth 64 by the gap Y.

Additional cams 50', 52' engagable with the inner wall 32 and rotatably assembled to the mobile flange 40 may be added to improve load capacity and performance of the clutch assembly 20. Accordingly, another tab 62' on the body 60 and biasing members 54', 56' are added to actuate the added cams 50', 52' in the manner described above. Preferably, the added cams 50', 52' are arranged to act on opposing sides of the inner wall 32 with respect to the first 50 and second 52 cams to minimize vibrations or play in the clutch assembly 20 due to clearances related to dimensional variation in manufacturing between the movable parts of the clutch assembly 20.

Figure 5:
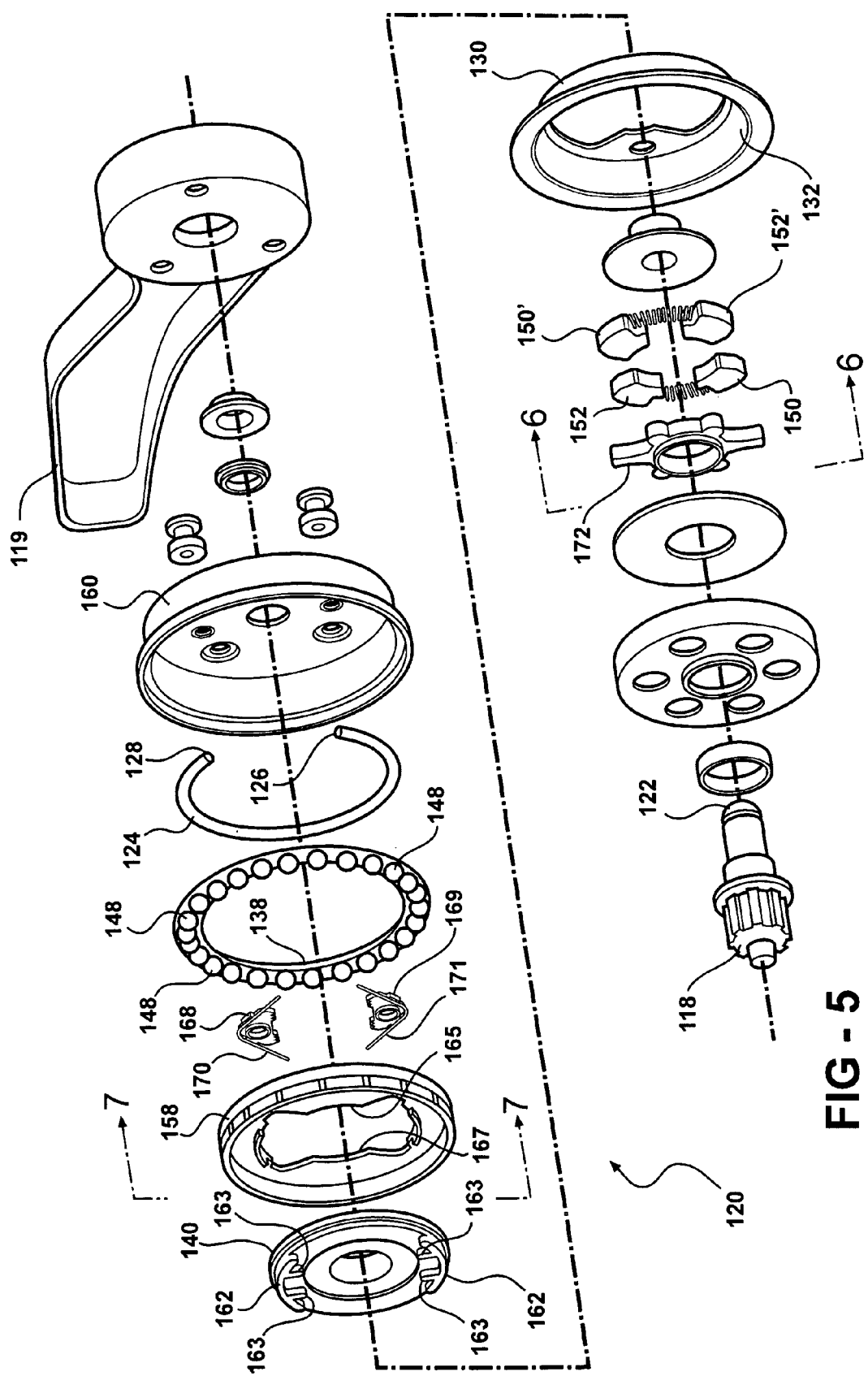
FIG. 5 is an exploded perspective view of the second embodiment of the invention.

A second embodiment from that shown in FIGS. 2 and 3 is shown in FIG. 5, wherein elements of the alternative embodiment similar to those in the first embodiment are indicated by reference characters offset by 100. The clutch assembly 120 includes a lever 119 that may be moved from its non-actuated state and positions clockwise and counterclockwise thereto. These positions are limited by stops that engage a spring 124 having ends 126, 128 which generally prevent the lever arm 119 from moving past a particular position in the clockwise position and the counterclockwise position, respectively, as shown in FIG. 5. The lever 119 is secured to the actuator 160. The spring 124 is seated within the actuator 160. Disposed adjacent the spring 124 is a race 138 having a plurality of ball bearings 148 that aid in the smooth movement of the actuator 160 and the lever 119.

In this embodiment, the cylinder 130 includes an end plate 158 that defines a seat within which the mobile flange 140 is able to rotate. Extending out from the cylindrical plate are a pair of tabs 162. Each of the tabs 162 include a pair of drive abutments 163 which extend outwardly from the tabs 162. The drive abutments 163 will be discussed in greater detail subsequently. The end plate 158 includes first 165 and second 167 pawl spring cam surfaces. The end plate 158 defines a space that houses two pawls 168, 169, each having a pawl spring 170, 171.

Figure 6:
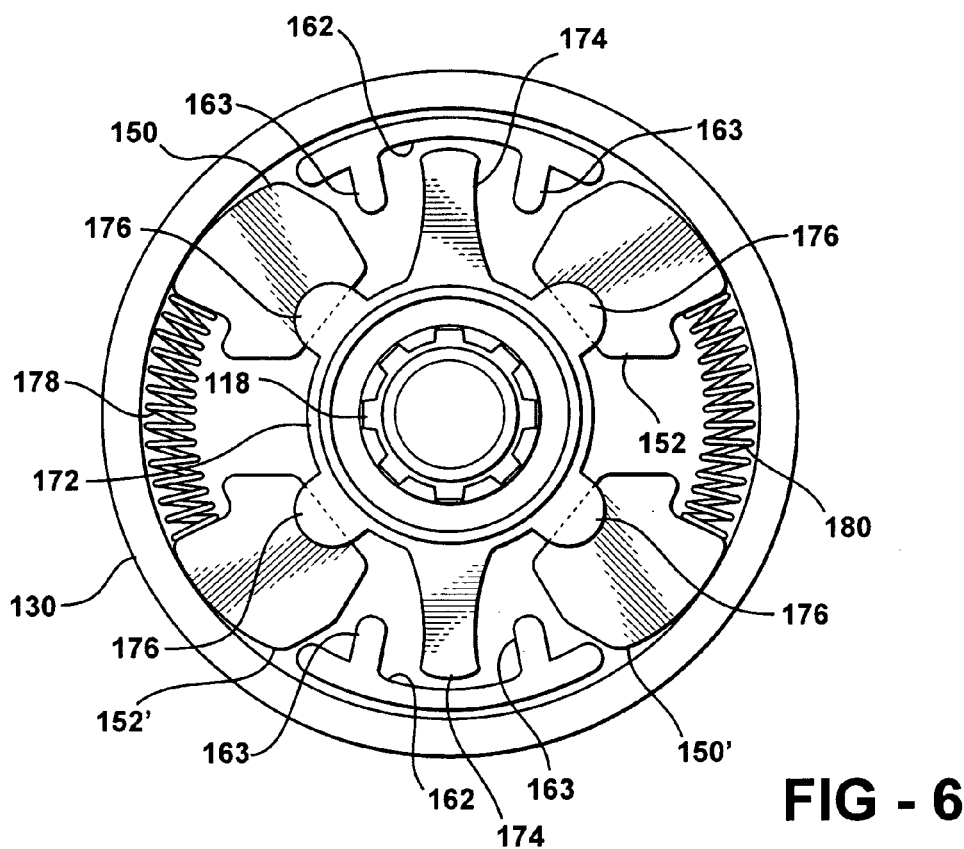
FIG. 6 is a side view taken along lines 6—6 of FIG. 5.

Referring to FIG. 6, a drive arm 172 is shown keyed to the input shaft 118. The drive arm 172 pivots about itself to rotate the input shaft 118. The drive arm 172 defines two distal ends 174, each engaging one of the tabs 162. The distal ends 174 are moved when the drive abutments 163 of the tabs 162 are engaged thereby. As with the first embodiment, the distance between the tabs 162 and the first 150 and second 152 cams is less than the distance between the tab abutments 163 and the distal end 174 of the drive arm 172. Again, this allows the first 150 and second 152 cams to disengage from the cylinder 130 allowing the drive arm 172 to be unlocked before the drive arm 172 is moved.

The drive arm 172 includes a plurality of fulcrums 176 that provide two functions. The first function of the fulcrums 176 is to provide a surface about which the first 150 and second 152 cams can rock or rotate. The second function of the fulcrums 176 is to provide a surface interconnecting the drive arms 172 to the cylinder 130 which the first 150 and second 152 cams can be forced between to prevent movement of the adjuster mechanism 16. As in the first embodiment, a second pair of first and second cams are shown in the embodiment and are indicated by reference characters 150' and 152', respectively. Positioning springs 178, 180 maintain the space between cams 150, 152' and 152, 150'.

Figure 7:
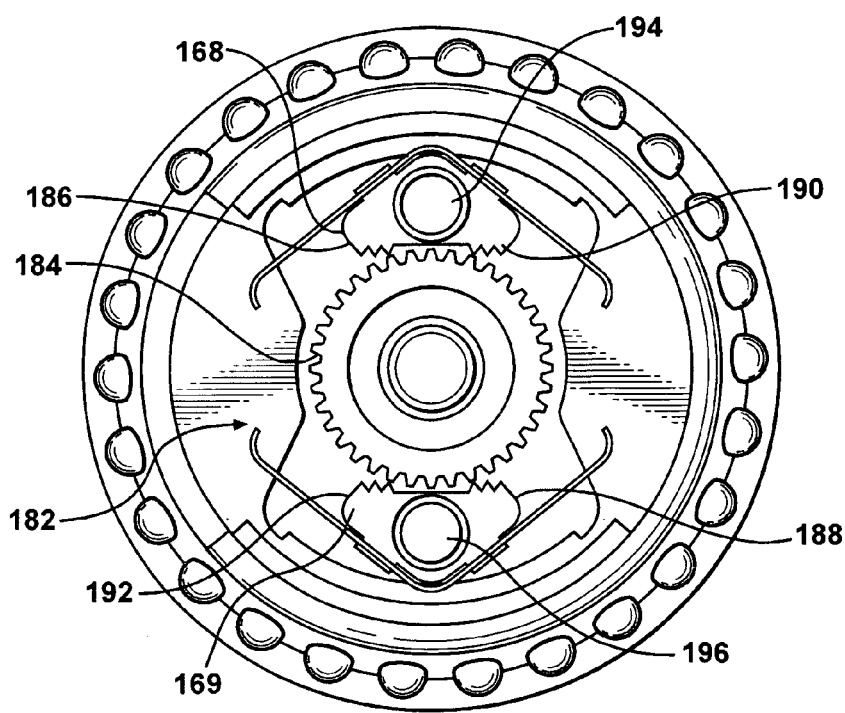
FIG. 7 is a side view taken along lines 7—7 of FIG. 5.

Referring to FIG. 7, a ratchet mechanism 182 is generally shown. The ratchet mechanism 182 includes a ratchet 184 that is circular in shape. The pawls 168, 169 engage the ratchet 184 in a selective manner to lock the input shaft 118 in position while the lever 119 is reciprocated back to a neutral position for further movement. As may be seen in FIG. 7, each of the pawls 168, 169 include a first head 186, 188 and a second head 190, 192. The first 186, 188 and second 190, 192 pawl heads are complementary about their respective offset axes 194, 196. Each offset axis 194, 196 is parallel to and spaced from the input shaft 118. The complementary design of the pawls 168, 169 allow for each to operate in both directions in which the lever 119 may be moved to move the adjuster mechanism 16 up or down. The pawl springs 170, 171 engage the pawl spring cam surfaces 165, 167 to maintain the pawls 168, 169 in a non-actuated state where neither of the pawls 168, 169 engage the ratchet 184.

Figure 8:
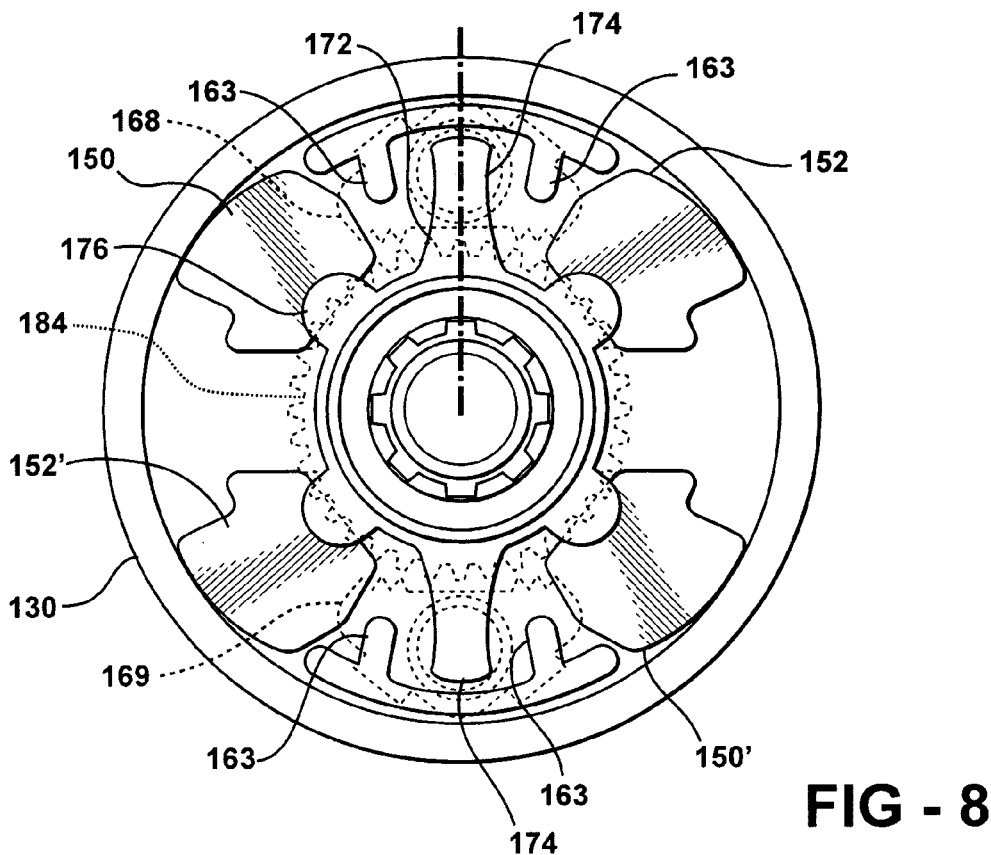
FIG. 8 is a side view of the second embodiment showing the clutch assembly in a non-actuated state.

Referring to FIG. 8, the second embodiment of the clutch assembly 120 is generally shown where both the actuator 160 and the ratchet mechanism 182 are in a non-actuated state. The cams 150, 152 are locked against the cylinder 130. The distal ends 174 of the drive arm 172 are not engaged by either of the drive abutments 163. Likewise, the pawls 168, 169 are not engaging the ratchet 184.

Figure 9:
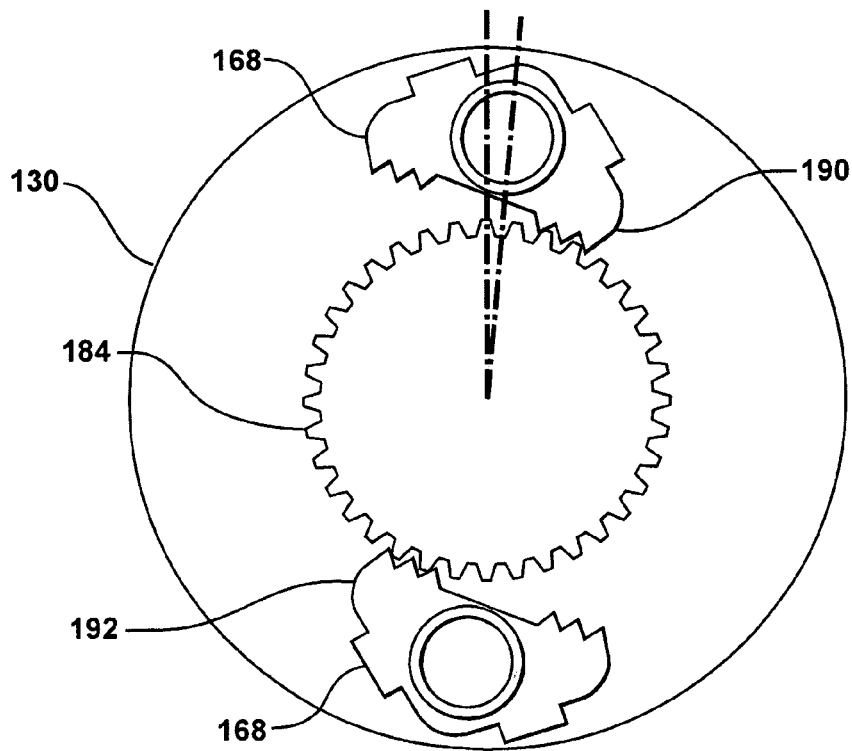
FIG. 9 is a side view showing a ratchet assembly of the second embodiment in an actuated state.

Referring to FIG. 9, a simplified view of the ratchet mechanism 182 is shown wherein the second heads 190, 192 of the pawls 168, 169 have engaged the ratchet 184. Each of the pawl heads 186–192 have a plurality of teeth that engage the teeth of the ratchet 184. The pawl geometries are designed to be self-locking to prevent slip between the pawls 168, 169 and the ratchet 184.

Figure 10:
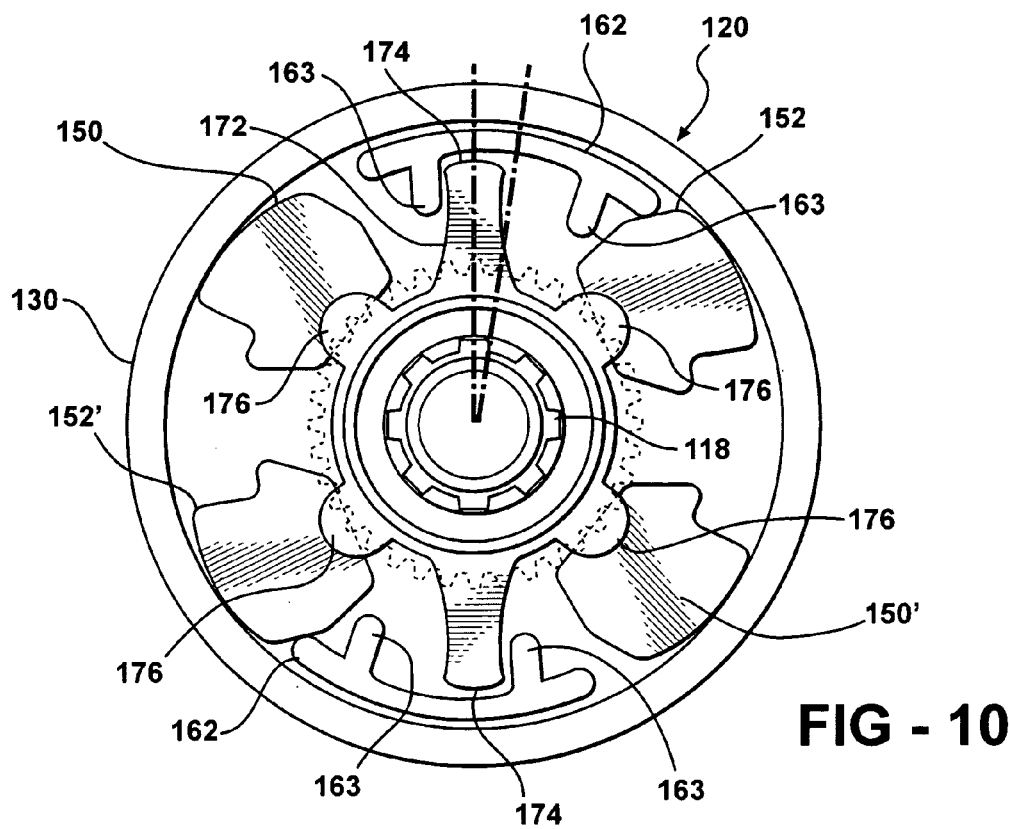
FIG. 10 is a side view of the second embodiment with the clutch assembly being actuated.

Referring to FIG. 10, the clutch assembly 120 is shown with the tabs 162 abutting the cams 152, 152'. This allows the actuator 160 to unlock the drive arm 172 prior to the actuator 160 attempting to move the drive arm 172. The profile of the cams 150, 150' allow for slippage when the actuator 160 is pivoting in the direction shown in FIG. 10. Therefore, with the second cams 152, 152' unlocked and the first cams 150, 150' slipping, the actuator 160 can move with respect to the cylinder 130.

Figure 11:
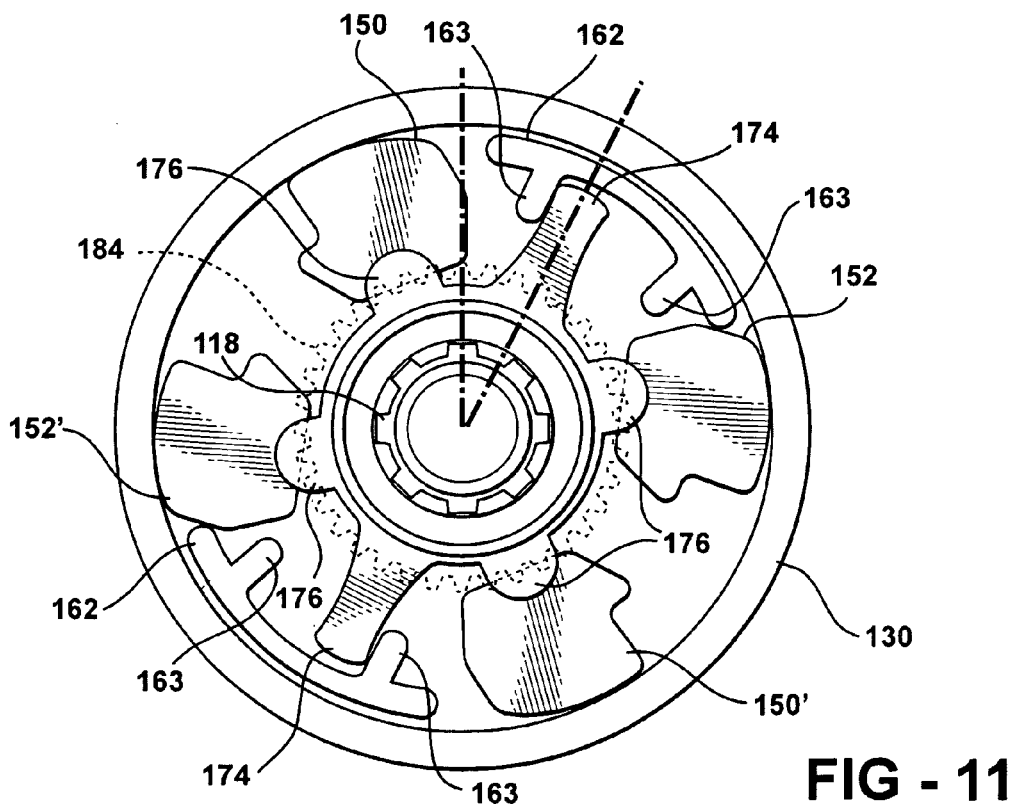
FIG. 11 is a side view of the second embodiment with the clutch assembly actuating the input shaft of the adjuster mechanism.

Referring to FIG. 11, it is shown where the actuator 160 has moved to close the gap between the drive abutments 163 and the distal ends 174 of the drive arm 172. In this position, the drive arm 172 remains unlocked and is moved by the drive abutments 163. By moving the drive arm 172, the input shaft 118 of the adjuster mechanism 16 is moved to adjust the height of the seat cushion 12. It should be appreciated by those skilled in the art that actuation of the actuator 160 in the opposite direction will provide unlocking of the drive arm 172 and rotation thereof in a direction opposite that shown in FIGS. 10 and 11 and, as such, it will not be explained in detail herein.

Figure 4:
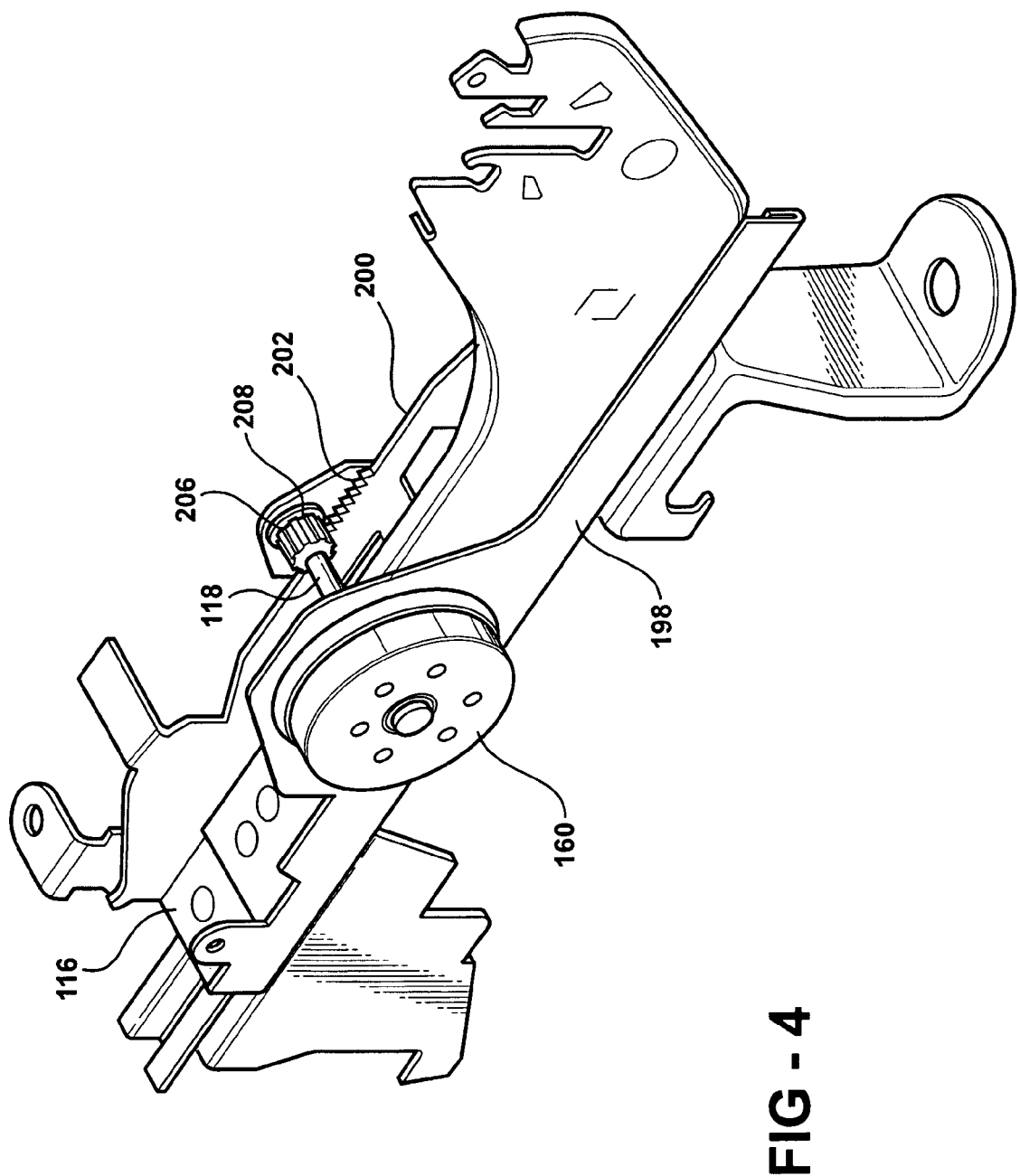
FIG. 4 is a perspective view of a second embodiment of the invention secured to an adjuster mechanism.

Referring to FIG. 4, the actuator 160 is fixedly secured to a fixed portion 198 of the adjuster mechanism 116. The adjuster mechanism 116 includes a rack 200. The rack 200 includes a plurality of rack teeth 202 defined along an edge 204 of the rack 200. The rack 200 is forwardly and rearwardly displaceable with respect to the fixed portion 198. The rack 200 is operatively coupled to the seat cushion 12 for moving the seat cushion 12 upwardly or downwardly relative to the floor 5 in response to the forward or rearward displacement, respectively, or the rack 200.

The input shaft 118 includes a distal end 206 projecting axially from the actuator 160. A gear 208 is fixedly secured to the distal end 206 of the input shaft 118. The gear 208 is engaged with the plurality of rack teeth 202 in the rack 200 for moving the rack 200 forwardly or rearwardly in response to corresponding rotation of the input shaft 118 via operation of the actuator 160, as described above.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed:

1. A clutch assembly for actuating an input shaft of an adjuster mechanism in a seat for a motor vehicle, said clutch assembly comprising:

a cylinder fixedly secured to the seat, said cylinder including an inner wall;

a mobile flange fixedly secured to the input shaft for rotating the input shaft with respect to said cylinder, said mobile flange including a periphery and a plurality of outwardly extending teeth extending about a portion thereof;

a cam mechanism selectively engagable with said inner wall of said cylinder to prevent movement of said mobile flange and the input shaft relative to said cylinder and operatively assembled to said mobile flange for movement in and out of engagement with said cylinder;

an actuator operatively interconnected to said cylinder for movement relative to said mobile flange, said actuator including a tab engagable with said cam mechanism during movement of said actuator relative to said mobile flange to move said cam mechanism out of engagement with said cylinder to release the adjuster mechanism allowing movement of the seat; and wherein said cam mechanism includes first and second cams, each disposed adjacent said tab on opposite sides thereof such that said tab engages said first cam when said actuator pivots in first direction and said tab engages said second cam when said actuator pivots in a second direction.

2. A clutch assembly as set forth in claim 1 wherein said actuator includes a plurality of inwardly extending teeth engagable with said plurality of outwardly extending teeth.

3. A clutch assembly as set forth in claim 2 wherein said tab is spaced from said first and second cams a predetermined distance.

4. A clutch assembly as set forth in claim 3 wherein each of said plurality of outwardly directed teeth and each of said inwardly directed teeth define a gap wider than said predetermined distance.

5. A clutch assembly as set forth in claim 1 including a drive arm fixedly secured to the input shaft and pivotal thereabout such that pivotal movement of said drive arm rotates the input shaft.

6. A clutch assembly as set forth in claim 5 wherein said drive arm includes a distal end engagable with said tab and to be driven thereby.

7. A clutch assembly as set forth in claim 6 wherein said drive arm further includes a plurality of fulcrums allowing said first and second cams to rock thereabout.

8. A clutch assembly as set forth in claim 7 including a ratcheting mechanism to prevent movement of the seat when said actuator reciprocates back to a steady state position from an extended position.

9. A clutch assembly as set forth in claim 8 wherein said ratcheting mechanism includes a circular ratchet fixedly secured to the input shaft.

10. A clutch assembly as set forth in claim 9 wherein said ratcheting mechanism includes a pawl pivotal about an offset axis parallel to and spaced from the input shaft.

11. A clutch assembly as set forth in claim 10 wherein said pawl includes first and second pawl heads, said second pawl head complementing said first pawl head with respect to said offset axis.

12. A clutch assembly as set forth in claim 11 including a pawl spring for spring biasing said pawl out of engagement with said ratchet.

13. A clutch assembly as set forth in claim 12 including a race extending around said cylinder between said cylinder and said actuator for reducing frictional forces therebetween.

14. A clutch assembly as set forth in claim 13 wherein said race includes a plurality of ball bearings.

15. A clutch assembly as set forth in claim 12 wherein said pawl spring extending between first and second pawl ends.

16. A clutch assembly as set forth in claim 15 wherein said cylinder includes first and second pawl spring cam surfaces, each of said first and second pawl spring cam surfaces receiving each of said first and second pawl ends.

17. A clutch assembly as set forth in claim 16 wherein said tab includes first and second drive abutments extending outwardly from said tab and engagable with said drive arm to move said drive arm.

18. A clutch assembly for actuating an input shaft of an adjuster mechanism in a seat for a motor vehicle, said clutch assembly comprising:

a cylinder fixedly secured to the seat, said cylinder including an inner wall;

a mobile flange fixedly secured to the input shaft for rotating the input shaft with respect to said cylinder;

a cam mechanism selectively engagable with said inner wall of said cylinder to prevent movement of said mobile flange and the input shaft relative to said cylinder and operatively assembled to said mobile flange for movement in and out of engagement with said cylinder;

an actuator operatively interconnected to said cylinder for movement relative to said mobile flange, said actuator including a tab engagable with said cam mechanism during movement of said actuator relative to said mobile flange to move said cam mechanism out of engagement with said cylinder to release the adjuster mechanism allowing movement of the seat;

said cam mechanism includes first and second cams, each disposed adjacent said tab on opposite sides thereof such that said tab engages said first cam when said actuator pivots in first direction and said tab engages said second cam when said actuator pivots in a second direction;

a drive arm fixedly secured to the input shaft and pivotal thereabout such that pivotal movement of the drive arm rotates the input shaft, said drive arm including a distal end engagable with said tab to be driven thereby and a plurality of fulcrums allowing said first and second cams to rock thereabout; and a ratchet mechanism to prevent movement of the seat when said actuator reciprocates back to a steady state position from an extended position.

* * * * *